(12) United States Patent
Panshin et al.

(10) Patent No.: US 9,961,234 B1
(45) Date of Patent: May 1, 2018

(54) REPLACEABLE ITEM AUTHENTICATION (71) Applicant: Hewlett-Packard Development Company, L.P., Houston, TX (US)

(72) Inventors: Stephen D. Panshin, Corvallis, OR (US); Jefferson P. Ward, Brush Prairie, WA (US); Erik D. Ness, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/672,970

(22) Filed: Aug. 9, 2017

Related U.S. Application Data (60) Division of application No. 15/469,202, filed on Mar. 24, 2017, now Pat. No. 9,781,305, which is a
(Continued)

(51) Int. Cl.
| | |
|---|---|
| *B41J 29/393* | (2006.01) |
| *H04N 1/44* | (2006.01) |
| *G03G 15/08* | (2006.01) |
| *B41J 29/38* | (2006.01) |
| *G06F 21/57* | (2013.01) |
| *G06F 21/44* | (2013.01) |
| *G03G 21/18* | (2006.01) |

(Continued)

(52) U.S. Cl.
CPC ........ *H04N 1/4433* (2013.01); *B41J 2/17546* (2013.01); *B41J 29/38* (2013.01); *G03G 15/0863* (2013.01); *G03G 21/1878* (2013.01); *G06F 21/44* (2013.01); *G06F 21/445* (2013.01); *G06F 21/57* (2013.01); *H04L 9/0819* (2013.01); *H04L 9/3242* (2013.01); *H04N 1/4413* (2013.01); *G03G 2215/0697* (2013.01); *G03G 2221/1823* (2013.01); *G06F 21/608* (2013.01); *H04L 63/0876* (2013.01)

(58) Field of Classification Search
CPC .. H04N 1/4433; H04N 1/4413; H04L 9/0819; H04L 9/3242; H04L 63/0876; G06F 21/445; G06F 21/44; G06F 21/608; G03G 15/0863; G03G 21/1878; G03G 2221/1823; G03G 2215/0697; B41J 2/17546; B41J 29/38; B41J 21/57
See application file for complete search history.

(56) References Cited

U.S. PATENT DOCUMENTS

| 7,084,951 B2 | 8/2006 | Silverbrook |
| 7,788,490 B2 | 8/2010 | Adkins et al. |

(Continued)

FOREIGN PATENT DOCUMENTS

WO    2006066270 A2    6/2006

OTHER PUBLICATIONS

Brother Genuine Supplies Authentication Center, <http://www.brother-usa.com/supplies/security.aspx>, accessed online Sep. 2, 2016, 1 pp.
(Continued)

*Primary Examiner* — Julian Huffman
(74) *Attorney, Agent, or Firm* — Michael A. Dryja (57) ABSTRACT

A replaceable item for a host device, such as a print substance cartridge for a printing device, stores multiple identities. For each identity, the replaceable item stores multiple authentication values, or passwords. The replaceable item selects an identity, and in response to a request for an authentication value from the host device, sends the requested authentication value for the selected identity.

13 Claims, 7 Drawing Sheets

Related U.S. Application Data continuation of application No. PCT/US2016/059107, filed on Oct. 27, 2016.

(51) Int. Cl.
*B41J 2/175* (2006.01)
*H04L 9/08* (2006.01)
*H04L 9/32* (2006.01)
*G06F 21/60* (2013.01)
*H04L 29/06* (2006.01)

(56) References Cited

U.S. PATENT DOCUMENTS

| | | |
|---|---|---|
| 8,291,229 B2 | 10/2012 | Vuillaume et al. |
| 9,141,816 B2 | 9/2015 | Refstrup |
| 9,227,417 B2 | 1/2016 | Ignatchenko et al. |
| 2007/0077074 A1 | 4/2007 | Adkins |
| 2011/0078449 A1 | 3/2011 | Starr et al. |

OTHER PUBLICATIONS

Ink and Toner Supplies, <http://www8.hp.com/in/en/ads/toner-acf/overview.html>, accessed online Sep. 2, 2016, 2 pp.
Xerox Authentication Label: How to Identify Genuine Xerox / Fuji Xerox Supplies, <http://www.fujixerox.com/eng/support/auth_lable/>, accessed online Sep. 2, 2016, 2 pp.

| | ID 1 | ID 2 | ID 3 | ID 4 | ID 5 | | ID M |
|---|---|---|---|---|---|---|---|
| PW 1 | | | | | | | X |
| PW 2 | | X | | | | | |
| PW 3 | | | | | X | | |
| PW 4 | X | | | X | | | |
| PW 5 | X | | X | X | | | |
| PW 6 | X | | | | | | |
| PW 7 | X | | | | X | | |
| PW 8 | | X | X | | | | |
| PW 9 | | | | X | | | |
| PW 10 | | X | X | | | | |
| PW 11 | | | | | X | | |
| PW 12 | | | | | | | X |
| PW 13 | | | | | | | X |
| PW 14 | | X | X | | X | | |
| PW 15 | | | | | | | X |
| PW 16 | | | | X | | | |

REPLACEABLE ITEM AUTHENTICATION

BACKGROUND

Devices that use replaceable items include printing devices, including stand-alone printers, copy machines, and all-in-one (AIO) devices that can perform multiple functions, such as printing, copying, scanning, and/or faxing. Example replaceable items for such printing devices include ink, toner, and/or other types of colorant, including two-dimensional (2D) colorant. Other example replacement items, specifically for three-dimensional (3D) printing devices, include 3D printing agent and 3D printing build material.

DETAILED DESCRIPTION

As noted in the background, devices that use replaceable items include printing devices. A supply of print substance, such as colorant or another type of print substance, is stored in a cartridge that can be inserted into a printing device. When the supply becomes depleted, the cartridge can be replaced with a cartridge having a fresh supply of the print substance in question. Cartridges having different types of print substances can also be switched out as desired. As an example, a cartridge having general-purpose ink may be switched out for a cartridge having photo-quality ink within an inkjet-printing device as desired.

Manufacturers of printing devices also typically make or otherwise supply the print substance used in the printing devices. From the end user's perspective, using manufacturer-supplied or manufacturer-approved print substance cartridges can facilitate desired output by the printing devices and/or inhibit damage to the printing devices. For the original equipment manufacturer (OEM) it may be difficult to guarantee printing device output or printing device functioning if the printing device uses third party cartridges. A third party print substance is beyond the control of the OEM. For example, it could provide for different print output or entail a patenting risk of shortening the life of the print device. In some instances, such as 3D printers, there might even be a safety risk to a user when a print substance is a non-approved print substance. In certain instances, usage of non-approved print substance may affect a warranty associated with the printing device.

Manufacturers may therefore instill cartridges with authentication security. A printing device may interrogate the cartridge to determine if it is authentic. If the cartridge is not authentic (e.g., is not OEM approved), then the printing device may initiate a certain procedure, such as, for instance, informing the end user, such as immediately or soon after installation.

In the PCT patent application filed on Jun. 17, 2016, and assigned PCT patent application no. PCT/US2016/38211, which is hereby incorporated by reference, an authentication scheme for a print substance cartridge for a printing device, and more generally for a replaceable item for a (host) device in which the item can be installed (i.e., more generally, the device to which the item can be connected) is described. The print substance cartridge stores a number of authentication values, or passwords. The cartridge includes logic (such as circuitry like a processor and memory storing code that the processor executes) to permit retrieval of just a subset of these authentication values. As different authentication values are requested from the cartridge, the cartridge can track the number of different values that have been returned. Once the cartridge has provided the maximum number of such unique authentication values, it will not provide any of the other authentication values that were originally stored in the cartridge. The cartridge continues to provide the previous authentication values that had been requested and returned, however.

As an example, a print substance cartridge may store sixty-four different passwords, or authentication values. Of these sixty-four, the cartridge may output no more than sixteen of the different passwords. Once the cartridge has provided sixteen different passwords, it will not provide any of the other forty-eight passwords that were stored in the cartridge. The cartridge can continue to respond to requests for the sixteen different passwords that it has already provided, however.

The print substance cartridge can also store hash values of the authentication values, or passwords. The hash values provide a way to determine whether a given authentication value that the cartridge has provided is correct. The cartridge may provide the hash values of the authentication values upon request, even for the values that the cartridge will not output. In the example of the previous paragraph, for instance, the cartridge can provide the hash values for all sixty-four passwords, even though the cartridge will provide no more than sixteen of the sixty-four passwords.

An authentication scheme using such a print substance cartridge may include a host printing device that might request four different passwords, or authentication values, stored in the cartridge. Different printing devices may and likely will request different passwords from a given cartridge. Similarly, a given printing device may and likely will request different passwords from different cartridges.

Having a print substance cartridge return a lesser number of authentication values than the total number of authentication values originally stored in the cartridge makes it much more difficult for a third party to frustrate such an authentication scheme. Even if a third party overcomes other security measures to obtain the sixteen authentication values that the cartridge will "give up," or output or provide, the likelihood that a third party cartridge storing just these sixteen values will be authenticated by a printing device is low. In the example authentication scheme that has been presented above, the printing device may and will likely request at least one authentication value that is not one of the sixteen values that the third party cartridge shares, rendering it unlikely that any given printing device will successfully authenticate such a cartridge.

Described herein, however, are techniques for another type of print substance cartridge for a printing device, and more generally for a replaceable item for a (host) device in which the item can be installed or more generally to which the item can be connected, which may be able to successfully pass authentication in the authentication scheme that has been described. The print substance cartridge stores a number of authentication values, or passwords, for a number of different cartridge identities. The authentication values that the print substance cartridge stores for each cartridge identity may not be a complete set of authentication values, however.

For example, in the referenced PCT patent application, a cartridge may store sixty-four authentication values, but just reveal just sixteen of these authentication values. Different cartridges having different cartridge identities can store different sets of sixty-four authentication values, with each cartridge revealing sixteen of the sixty-four authentication values that it stores. Each cartridge can thus be interrogated to identify the sixteen authentication values that it will output. A new cartridge can then be constructed that stores the sixteen authentication values for each of these cartridges, by their identities.

Therefore, a cartridge in accordance with the techniques described herein may not have a complete set of authentication values for any given cartridge identity, but rather can have an incomplete set of authentication values for each of what can be a large number of different cartridge identities. When such a cartridge is installed in a printing device, it can select one of its cartridge identities to use for authentication within the printing device. If the authentication values that the cartridge stores for the selected identity includes those that the printing device requests, then the cartridge will successfully pass authentication within the device.

A cartridge identity, and more generally a replaceable item identity, can be considered to encompass the hash values for a complete set of authentication values. In the referenced PCT patent application, for instance, even though a cartridge will reveal just a limited number of the authentication values it stores, the cartridge may reveal the hash values for all the authentication values it stores. The hash values can be one-way hash values so that the authentication values cannot be determined from the hash values. Each hash value can be generated using a one-way hash function of a corresponding authentication value and a unique identity of the cartridge in question, or is otherwise linked to the unique identity of the cartridge in question. The hash values that the cartridge stores can therefore be considered as or as part of the cartridge's identity, since the hash values implicitly encode the unique identity of the cartridge.

As such, a cartridge in accordance with the techniques described herein can store the hash values retrieved from a large number of different cartridges of the referenced PCT patent application as its multiple cartridge identities. For each cartridge identity—that is, for each set of hash values of a corresponding complete set of authentication values— the cartridge stores a number of authentication values. The number of authentication values that the cartridge stores for a cartridge identity can be less than the number of authentication values for which there are hash values, however. As noted above, this is because a cartridge of the referenced PCT patent application will not reveal all the authentication values that it stores, but may reveal the hash values for all the authentication values. Thus, a cartridge in accordance with the techniques described herein can include the limited sets of authentication values that a number of such cartridges of the referenced PCT patent application will reveal, along with the hash values for all the authentication values of those cartridges.

Figure 1:
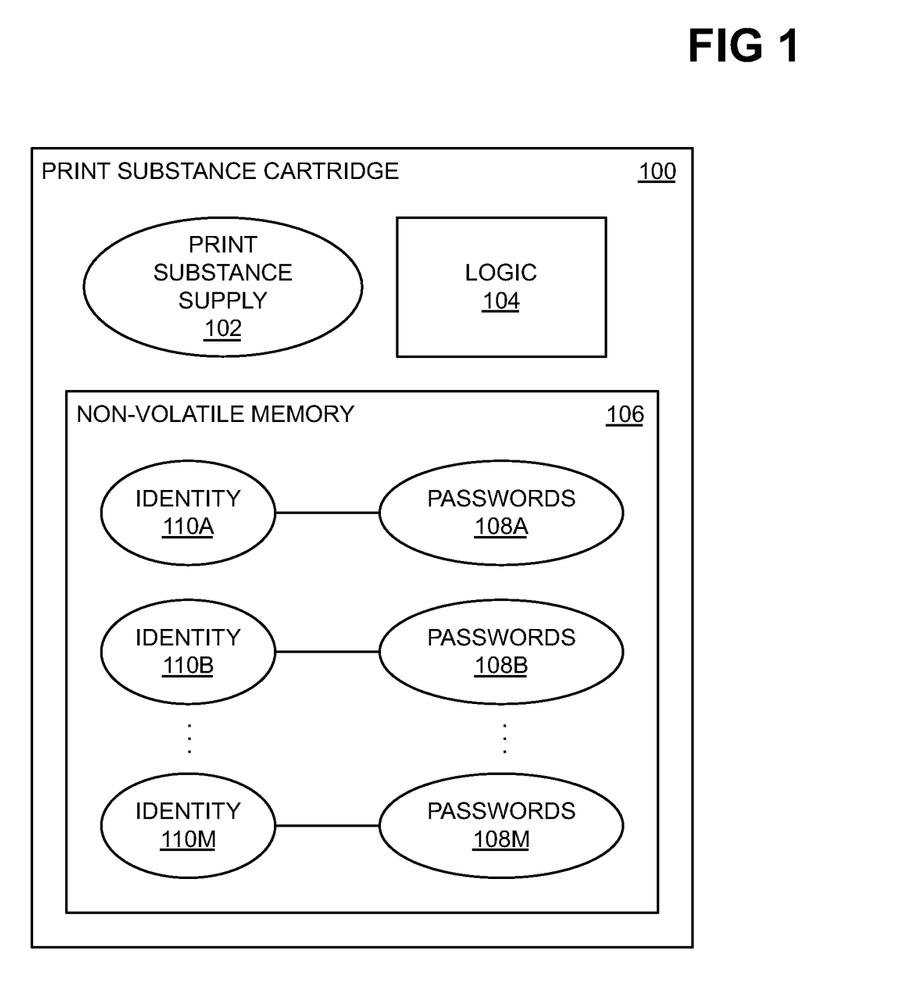
FIG. 1 is a diagram of an example print substance cartridge for a printing device.

FIG. 1 shows an example print substance cartridge 100 for a printing device. The cartridge 100 includes a print substance supply 102. The cartridge 100 may contain any volume of print substance, such as from several milliliters to tens of liters. Different examples of print substance include ink for an inkjet-printing device, and liquid or powder toner for a laser-printing device. Such ink and toner are themselves examples of two-dimensional (2D) colorant, which is colorant used by a suitable printing device to form images on media like paper that minimally if at all extend in a third dimension perpendicular to the two dimensions defining the plane of the surface of the media on which the images have been formed. Other examples of print substance include three-dimensional (3D) printing agent and 3D printing build material, which are used by a suitable 3D printing device to form a 3D object that is typically removable from any substrate on which the object is constructed. Certain print substances, such as ink, may be used for both 2D and 3D printing.

The print substance cartridge 100 includes logic 104. The logic 104 can be implemented as circuitry within the cartridge 100. For example, the logic 104 can include a processor, and a non-volatile computer-readable data storage medium storing computer-executable code that the processor executes. In this respect, then, in one implementation, the logic 104 may include a microprocessor and embedded software stored on the microprocessor itself, where the non-volatile computer-readable data storage medium is integrated within the microprocessor. In another implementation, the logic 104 may include a microprocessor and software embedded within a non-volatile medium separate from the microprocessor.

As another example, the logic 104 can be or include an application-specific integrated circuit (ASIC) or a field-programmable gate array (FPGA). More generally in this respect, the logic 104 can be implemented using logic gates. As a third example, the logic 104 may be implemented as any combination of a processor, software stored within the processor or on a medium separate to the processor, and logic gates.

The print substance cartridge 100 includes non-volatile memory 106. The memory 106 can be semiconductor memory, and is non-volatile in that when power is removed from the cartridge 100, the memory 106 still retains its contents. The memory 106 stories cartridge identities 110A, 110B, . . . , 110M, which are collectively referred to as the cartridge identities 110. The cartridge identities 110 can also be referred to as replaceable item identities. For each cartridge identity 110A, 110B, . . . , 110M, the memory 106 stores multiple passwords 108A, 108B, . . . , 108M, respectively, which are collectively referred to as the passwords 108. The passwords 108 are also referred to as authentication values.

The passwords 108, or authentication values, are stored by the cartridge 100 so that the cartridge 100 can prove to a host printing device that it is authentic. Stated another way, the passwords 108 are used to authenticate the cartridge 100 within the printing device. The passwords 108 can each be a series of bits, such as 256 bits.

Each cartridge identity 110 can be or include hash values for at least the passwords 108 that the non-volatile memory 106 stores for the cartridge identity 110 in question. The hash values are stored so that the cartridge 100 can prove to a host printing device that the passwords 108 of a corresponding cartridge identity 110 are correct. Stated another way, the hash values that constitute a cartridge identity 110 are used to verify the passwords 108 of this same identity 110 provided by the cartridge 100. The hash values may be one-way hash values of the passwords 108 of a corresponding cartridge identity 110, which means that a password 108 cannot be determined just by knowing its corresponding hash value, even if the one-way hash function used to generate the hash value from the password is known.

At power on of the cartridge 100, such as at power on of the printing device in which the cartridge 100 has be installed, the logic 104 may have to select one of the identities 110 to assume for authentication of the cartridge 100 within the device, until the cartridge 100 is powered off then powered on again. Powering on the cartridge 100 can include power cycling the cartridge 100, such as by powering off and then on the printing device in which the cartridge 100 has been installed or by performing a hard or cold reset of the device. Powering on the cartridge 100 can include inserting the cartridge 100 for the first time in the printing device, after removal of the cartridge 100 from a container in which it has been provided or after removal of the cartridge 100 from a different printing device in which it has been installed. Powering on the cartridge 100 can include removing the cartridge 100 from the printing device in which it has been installed, and reinstalling the cartridge 100 in this same device, while the printing device remains powered. Powering on the cartridge 100 can also occur when a door by which the cartridge 100 is accessed within the printing device is opened. within Powering on of the cartridge 100 can further include powering on just the logic 100 itself, such as when printing a print job using the cartridge 100 has been completed, and/or when a print job is received.

Once the logic 104 has selected an identity 110 to assume for authentication of the cartridge 100 within the printing device in which it has been installed, it may not be permitted by the device to change its identity 110 until the cartridge 100 has again been powered on. This is because the printing device may, after requesting and receiving the hash values that constitute the identity 110, use these hash values to validate any previously or subsequently received password 108, and the hash values that constitute the assumed identity 110 may be correct just for verifying the passwords 108 of this identity 110. Thus, once the logic 104 has selected its identity 110, it may proffer just the passwords 108 that the non-volatile memory 106 stores for this identity 110 for authentication, and not the passwords 108 that the memory 106 stores for any other identity 110, until another power on of the cartridge 100. If the cartridge 100 fails authentication—because, for instance, the memory 106 stores a limited, incomplete set of passwords 108 for the identity 110 that has been selected, where this set does not include the requested password—the cartridge 100 may thus be unable to attempt authentication again until it has been powered on again.

Different techniques are described below as to how the cartridge 100 (and more specifically the logic 104 thereof) can select which identity 110 to assume for authentication with a printing device. Some techniques can be employed when a printing device requests the identity of the cartridge 100 before requesting any password from the cartridge 100, where the identity in this sense can include the hash values by which subsequently requested passwords will be verified for validity. Other techniques can be employed when a printing device does not request the identity of the cartridge 100 before requesting a password from the cartridge 100, where the identity in this sense can likewise include the hash values by which passwords are verified for validity. Other techniques can be employed when the cartridge 100 has previously selected an identity 110 that resulted in successful authentication of the cartridge 100.

Figure 2:
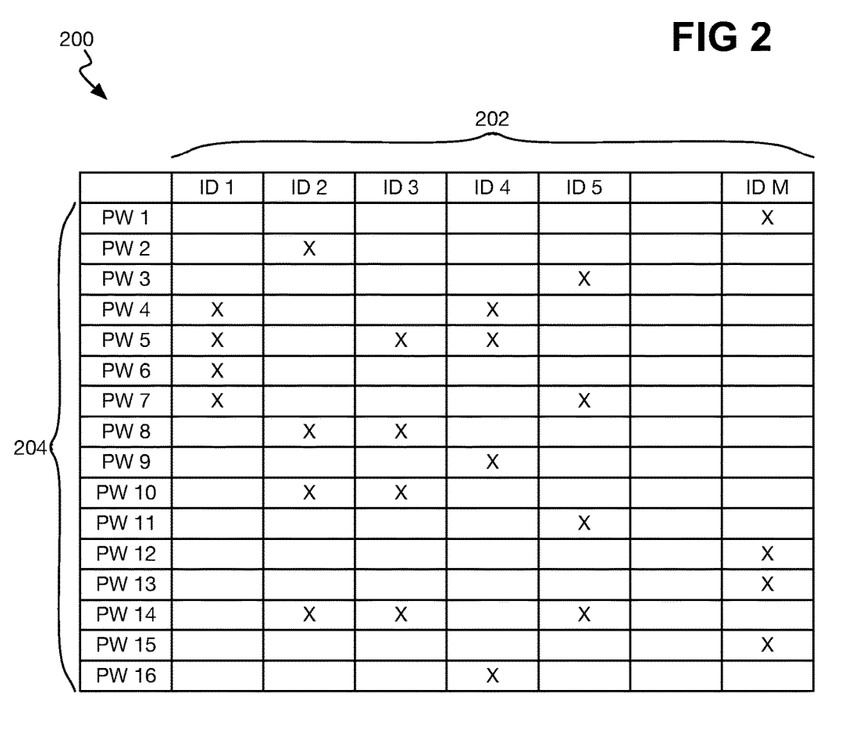
FIG. 2 is a diagram of an example table of a reduced set of passwords, or authentication values, that may be stored for cartridge identities, or replaceable item identities, within a cartridge or replaceable item.

FIG. 2 shows an example table 200 of a reduced set of passwords, or authentication values, that may be stored for cartridge identities, or replaceable item identities, within a cartridge or replaceable item. In the example table 200, columns 202 correspond to unique cartridge identities stored within a cartridge. In FIG. 2, there are M such unique cartridge identities. In the example table 200, rows 204 correspond to unique passwords that can be requested for any cartridge identity. In FIG. 2, there are sixteen such unique passwords, but in another implementation, there may be sixty-four or a different number of unique passwords. The number of identities M can be greater than the number of unique passwords that can be requested for any identity by an order of 10, 100, 1,000, or more. For example, there may be hundreds, thousands, tens of thousands, or more cartridge identities stored within a cartridge.

The X's in the cells of the table 200 denote the unique passwords that the cartridge does in fact store for each cartridge identity. For example, for cartridge identity 1, the cartridge stores passwords 4, 5, 6, and 7. For identity 2, the cartridge stores passwords 2, 8, 10, and 14; for identity 3, the cartridge stores passwords 5, 8, 10, and 14; and for identity 4, the cartridge stores passwords 4, 5, 9, and 16. For identity 5, the cartridge stores passwords 3, 7, 11, and 14; and for identity M, the cartridge stores passwords 1, 12, 13, and 15.

The password that the cartridge stores for a given identity is generally and typically unique to that identity, even if it shares the same password number as that of a password that the cartridge stores for another identity. For example, password 5 for identity 1 is typically different from password 5 for identity 3. Similarly, password 5 for each of identities 1 and 3 is typically different from password 5 of identity 4.

A printing device in which the cartridge of FIG. 2 has been installed may request any password number from 1 through 16. The printing device may request multiple passwords. Each cartridge identity 1 through M can be or include the hash values by which all the passwords 1 through 16 of that identity can be verified, even though the cartridge just stores four passwords for each identity.

For example, if the cartridge has assumed the cartridge identity 2, it will be able to be successfully authenticated if just one or more of the passwords 2, 8, 10, and 14 are requested. This is because for cartridge identity 2, the cartridge stores passwords 2, 8, 10, and 14. If the cartridge has assumed the cartridge identity 2 and any password other than 2, 8, 10, or 14 is requested, the cartridge will not be able to be successfully authenticated. This is because the cartridge does not store any password other than passwords 2, 8, 10, and 14 for cartridge identity 2.

In the referenced PCT patent application, a cartridge may store a complete set of passwords 1 through 16 and one corresponding set of hash values—i.e., one identity—for these passwords. However, the cartridge may reveal just four of the passwords, such as the first four passwords requested from the cartridge. Therefore, a cartridge in accordance with techniques disclosed herein, such as the cartridge of FIG. 2, may be programmed by interrogating multiple such cartridges of the referenced PCT patent application, to obtain their sets of hash values as the unique cartridge identities, and the four passwords that each cartridge will reveal as the four passwords that are stored with the set of hashes provided by that cartridge.

For example, a first cartridge of the referenced PCT patent application may correspond to cartridge identity 1. The cartridge identity 1 can be or include the hash values for all passwords 1 through 16 of this cartridge, as retrieved from the cartridge. However, the cartridge may just output passwords 4, 5, 6, and 7 (i.e., as the four first passwords requested from the cartridge). Therefore, passwords 4, 5, 6, and 7 are retrieved and stored as corresponding to identity 1. A second cartridge of the referenced PCT patent application may correspond to cartridge identity 2, which can be or include the hash values for all passwords 1 through 16 of this cartridge, as retrieved from the cartridge. However, the cartridge may output just passwords 2, 8, 10, and 14 (i.e., as the first four passwords requested from the cartridge). Therefore, passwords 2, 8, 10, and 14 are retrieved and stored as corresponding to identity 2. This process can then be repeated for third, fourth, fifth, and ultimately through m-th cartridges of the referenced PCT patent application.

Figure 3:
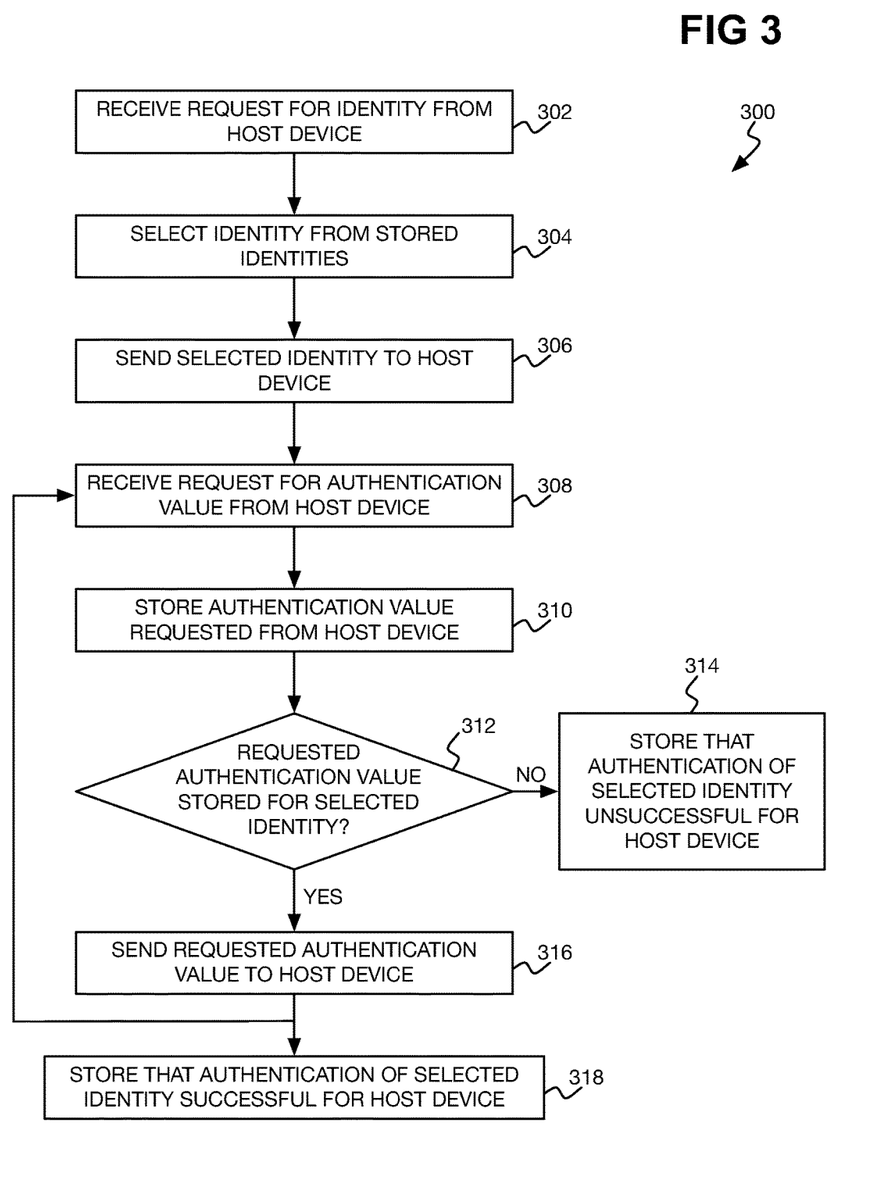
FIG. 3 is a flowchart of an example method that a print substance cartridge or other replaceable item for a device can perform.

FIG. 3 shows an example method 300 that a replaceable item for a device, such as the print substance cartridge 100 for a printing device, can perform. The method 300 can be implemented as computer-readable code stored on a non-transitory computer-readable data storage medium and that a processor executes. As such, the logic 104 of the cartridge 100 can perform the method 300, for example. The replaceable item performs the method 300 upon installation in or connection to a host device and at power on of the replaceable item.

The method 300 relates to a scenario in which the replaceable item receives a request for an identity prior to receiving a request for an authentication value from the host device. Therefore, the replaceable item has to select and assume an identity for usage with the host device before the item is able to learn the authentication values that the device will be requesting. The replaceable item thus receives a request for its identity from the host device (302), and selects an identity to assume from the replaceable item identities that it stores (304). The replaceable item sends the selected identity to the host device (306). For instance, the replaceable item may send the hash values that may constitute the selected identity.

The replaceable item receives a request for an authentication value from the host device (308). The replaceable item stores information indicating which authentication value the host device requested (310). For example, if the host device requests authentication value number n, the replaceable item stores that the host device has requested authentication value number n. The replaceable item can store the address of the host device that may be determinable from the request received in part 302 or part 308 as part of this information. For example, the replaceable item may store the media-access controller (MAC) address of the host device.

If the replaceable item does not have the requested authentication value stored for the selected identity (312), then the item stores information indicating that authentication of the selected identity has been unsuccessful for or with the host device (314), which can include storing the address of the host device. The replaceable item may not send any response to the host device. The replaceable item thus has to wait for it to be powered on again so that another authentication attempt can be made, such as by performing the method 300 again.

If the replaceable item does have the requested authentication value stored for the selected identity (312), however, then the item sends the requested authentication value to the host device (316). The method 300 then proceeds in one of two ways. First, the replaceable item may receive another authentication value request from the host device (i.e., for a different authentication value), in which case the method proceeds from part 316 back to part 308.

Second, the replaceable item may determine that the selected identity that the item has assumed resulted implicitly or explicitly in successful authentication of the item within the host device. In this case, the replaceable item stores information indicating that authentication of the selected identity was successful for the host device (318), which can include storing the address of the host device. For instance, if the replaceable item is a print cartridge and the host device is a printing device, if the printing device begins using the print cartridge to form images on media, then the item can conclude that implicit successful authentication has occurred. As another example, the host device may explicitly indicate to the replaceable item that the item has been successfully authenticated.

Figure 4:
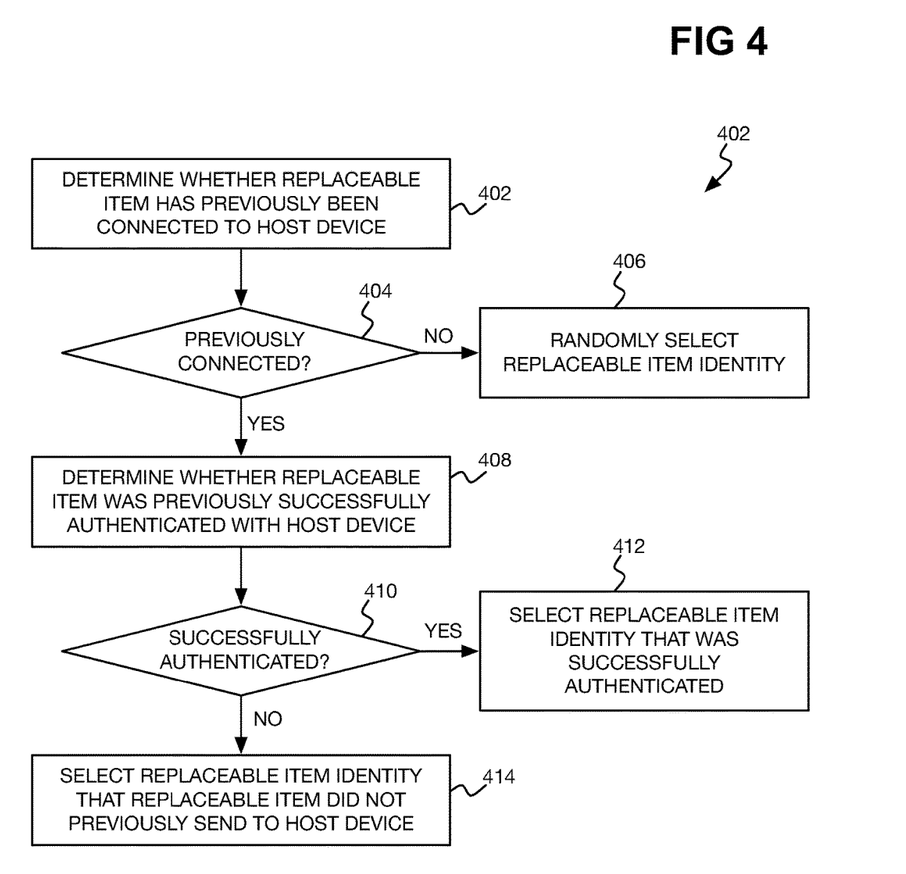
FIG. 4 is a flowchart of an example method that a print substance cartridge or other replaceable item for a device can perform to implement a portion of the method of FIG. 3.

FIG. 4 shows an example method 400 that a replaceable item for a device can perform to select an identity to assume within the device at power on in the method 300. For instance, a replaceable item can perform the method 400 to implement part 304 of the method 300, after the item has received a request for an identity from the host device in part 302 and before the item has received a request for an authentication value in part 306. The replaceable item determines whether it has previously been connected to the host device (402).

For instance, when the replaceable item stores the authentication values requested from the host device in part 310, and when the item stores whether it was unsuccessfully or successfully authenticated in part 314 or 318, respectively, the replaceable item stores the address or other identifying information of the host device received in part 302 or 308 of the method 300. Therefore, the replaceable item can compare the address, for example, of the host device from which the item just received the request in part 302, and compare it to the host device addresses that it stored when previously performing parts 310, 314, and/or 318. If the address of the host device from which the replaceable item just received the request in part 302 matches any of those previously stored, then the replaceable item has been previously connected to the host device. If the address does not match any previously stored host device address, then the replaceable item has not been previously connected to the host device in question.

If the replaceable item has not been previously connected to the host device (404), then in one implementation the replaceable item randomly selects a replaceable item identity from the replaceable item identities that it stores (406). In other implementations, the replaceable item may select a replaceable item identity in part 406 in a different manner. For example, if the replaceable item identities are stored in an ordered manner, the replaceable item may select the first identity in the order in which they are stored. As another example, the replaceable item identity may select an identity that it has not yet sent to any host device, by randomly selecting an identity from the previously unselected identities, or by selecting the first identity that has not yet been selected in the order in which the identities are stored.

As a third example, if during the immediately prior power on of the replaceable item the item was successfully authenticated by the host device to which it was connected at that time, then the replaceable item may select the replaceable item identity that it had selected during this successful authentication. For instance, the replaceable item may have been connected to a first host device, and at the time of disconnection from the first host device the item was successfully authenticated with the first host device using a given identity. The replaceable item is then connected to a second host device, to which it has never been connected before, and is performing part 406 to select an identity to assume with the second host device. In this implementation, the replaceable item can again select the given identity it successfully assumed with the first host device, to assume with the second host device.

If the replaceable item has been previously connected to the host device (404), then the replaceable item can determine whether the replaceable item was previously successfully authenticated with this host device (408). If the replaceable item was previously successfully authenticated with the host device (410), then the item may select the replaceable item identity that it assumed during this prior authentication (412). In one implementation, part 408 tests just whether the replaceable item was previously successfully authenticated with the host device during the immediately prior power on when connected to the device. That is, in this implementation, part 408 tests whether the last time the replaceable item was connected to the host device and powered on, the replaceable item was successfully authenticated.

Such an implementation can ensure that the replaceable item does not repeatedly select a replaceable item identity that in the past did result in the item being successfully authenticated with the host device, but more recently did not. This implementation means that the replaceable item will select the same identity to assume with a host device if the immediately prior time the item was connected to the host device and powered on the replaceable item was successfully authenticated. However, if the replaceable item is not successfully authenticated after selecting this same identity, then the item will not automatically select the identity the next time the item is connected to the host device and powered on.

If the replaceable item was previously unsuccessfully authenticated with the host device (410)—either during just the last authentication attempt or having never been successfully authenticated, depending on how part 408 is implemented as noted above—then the item may select a replaceable item identity that the replaceable item has not previously sent to the host device (414). As such, in this implementation, the replaceable item can randomly or in an ordered manner select an identity from the replaceable item identities that the item has not been assumed before with the host device. In a second implementation, the replaceable item may randomly or in an ordered manner select an identity from the replaceable item identities that it stores, regardless of whether the identity was previously unsuccessfully authenticated with the host device.

However, a third implementation of part 414 may be employed when it is assumed that the host device is likely to request the same authentication values from the replaceable item as it did during prior authentication requests. In this implementation, the replaceable item may randomly or in an ordered manner select an identity from the replaceable item identities for which it stores the authentication values that the host device previously requested. Consider the following example in relation to FIG. 2. At first power on of the replaceable item, the item may select identity 3, and the host device may request authentication value 5. The replaceable item has this requested authentication value for identity 3, and therefore is able to return the requested authentication value. The host device may then request authentication value 4. The replaceable item does not have authentication value 4, and therefore authentication fails.

At second power on of the replaceable item, the item may select identity 1, because it assumes that the host device will request authentication values 4 and 5 as it did during the last power on. If the host device does request authentication values 4 and 5 (in either order), then the replaceable item is able to return both authentication values. The host device may then request authentication value 9. The replaceable item does not store authentication value 9 for identity 1, and therefore authentication again fails.

However, at third power on, the replaceable item selects identity 4, because it assumes that the host device will requested authentication values 4, 5, and 9 (in any order), as it did at second power on. If the host device does request authentication values 4, 5, and 9 during third power on, then the replaceable item is able to return all three authentication values. The host device may then request authentication value 16. The replaceable item stores authentication value 16 for identity 4, and thus can return this authentication value as well. If the host device does not request any further authentication values, then authentication has succeeded.

The replaceable item may select a replaceable item identity in part 414 in a fourth implementation that combines two or more of the three implementations that have been described for part 414. As one example, the replaceable item may first select a replaceable item identity from the identities for which the item stores authentication values that the host device has previously requested. After a predetermined number of unsuccessful authentication attempts in a row, or after concluding via a statistical, machine learning, or another technique that the host device is likely not selecting the same authentication values, the replaceable item may then select a replaceable item identity from the identities that the item has not previously selected with the host device. After another predetermined number of unsuccessful authentication attempts in a row, the replaceable item may then select an identity from all the identities that it stores, without regards to whether the item has previously assumed the identity with the host device.

Such a combination implementation can be useful because the replaceable item may not have prior knowledge as to the number of authentication values a host device may request, whether the host device will request the same authentication values, and/or the order in which the authentication values are requested, if any. For example, one host device may request three authentication values, and another host device may request four. A third host device may request between two and four authentication values. A host device may request the authentication value numbers a, b, c, d, or it may not. A host device may request authentication value numbers a, b, c, d in a random order, or may always request a followed by b, followed by c, followed by d. The combination implementation therefore permits the replaceable item to change strategies when the current strategy appears unlikely to succeed.

Figure 5:
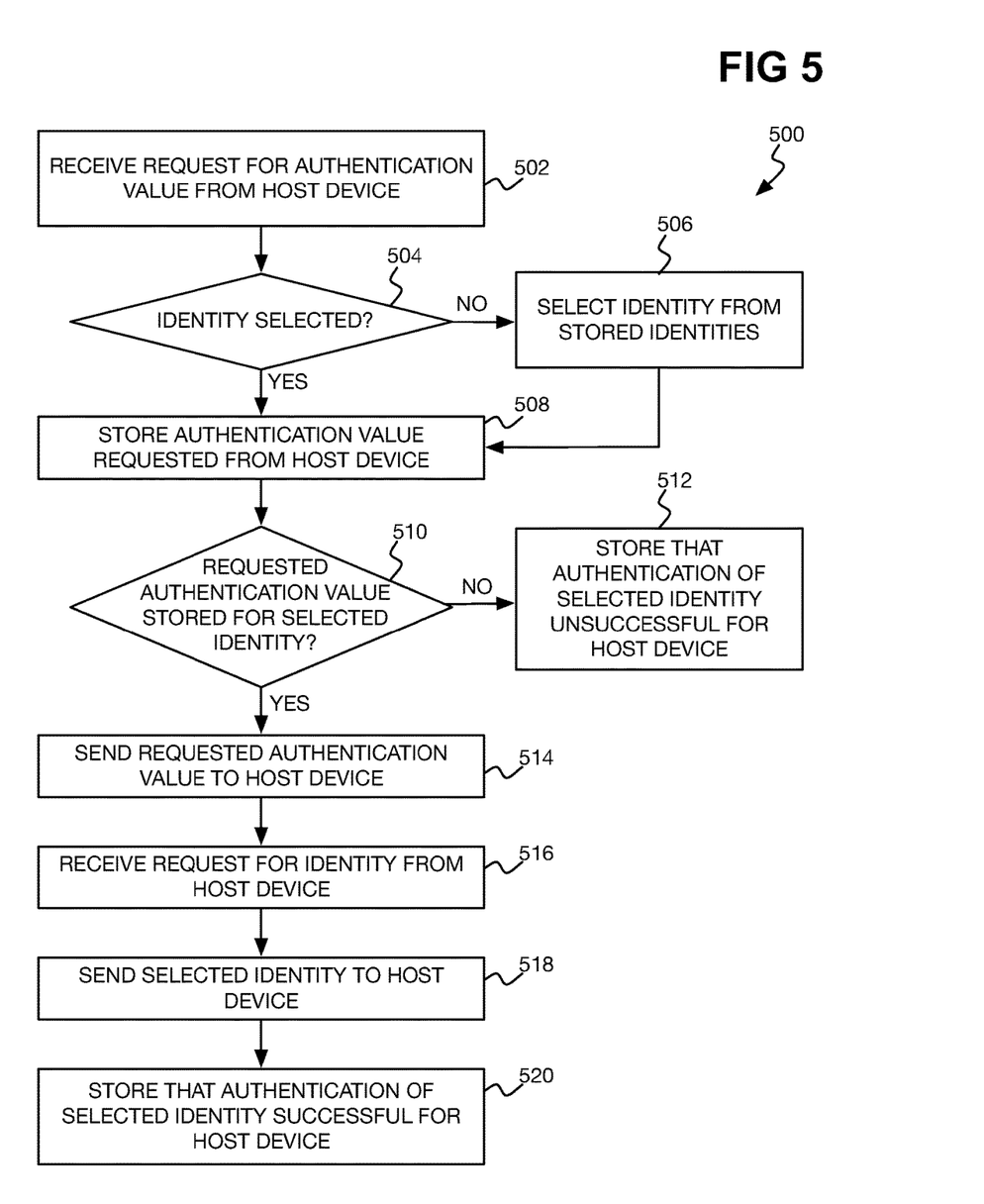
FIG. 5 is a flowchart of another example method that a print substance cartridge or other replaceable item for a device can perform.

FIG. 5 shows another example method 500 that a replaceable item for a device, such as the print substance cartridge 100 for a printing device, can perform. Like the method 300 of FIG. 3, the method 500 can be implemented as computer-readable code stored on a non-transitory computer-readable data storage medium and that a processor executes. As such, the logic 104 of the cartridge 100 can perform the method 500, for example. The replaceable item performs the method 500 upon installation in or connection to a host device and at power on of the replaceable item.

The method 500 relates to a scenario in which the replaceable item receives a request for an identity after receiving a request for an authentication value from the host device. Therefore, the replaceable item does not have to select and assume an identity for usage with the host device before the item learns the first authentication value that the device is requesting. The replaceable item thus receives a request for an authentication value from the host device (502). The first time that part 502 is performed during the method 500, it is performed prior to the replaceable item having selected an identity. As such, if the replaceable item has not yet assumed an identity (504), then the replaceable item selects an identity to assume from the replaceable item identities that it stores (506). The replaceable item selects one of the replaceable item identities for which it stores the requested authentication value. Part 506 is thus performed just once each time the method 500 is performed.

If the replaceable item has already assumed an identity (504), or after the item has selected an identity to assume (506), the replaceable item stores information indicating which authentication value the host device requested (508). As described above in relation to part 308, if the host device requests authentication value number n, the replaceable item stores that the host device has requested authentication value number n. The host device can store the address of the host device that may be determinable from the request received in part 502.

The replaceable item will have the first requested authentication value for the selected identity, because the item selects an identity for which it does indeed store the authentication value requested the first time part 502 is performed. However, the replaceable item may not have a subsequently requested authentication value for the selected identity. If the replaceable item does not have the requested authentication value stored for the selected identity (510), the item stores information indicating that authentication of the selected identity has been unsuccessful for or with the host device (512), which can include storing the address of the host device. As described above in relation to part 314 of the method 300, the replaceable item may not send any response to the host device, and further the item has to wait for it to be powered on again so that another authentication attempt can be made, such as by performing the method 500 again.

If the replaceable item does have the requested authentication value stored for the selected identity (510), however, then the item sends the requested authentication value to the host device (514). The method 500 may then proceed in one of two ways. The replaceable item may receive another authentication value request from the host device (i.e., for a different authentication value), in which case the method 500 proceeds from part 514 back to part 502.

However, at some point the replaceable item will receive a request for its identity from the host device (516), and in response the item sends the identity selected in part 506 to the host device (518), such as the hash values of the authentication values for the selected identity that may constitute the selected identity. Parts 516 and 518 are depicted as being performed after part 514 for illustrative convenience. More generally, part 516 is performed in the method 500 at any time after the first time part 502 has been performed, and part 518 is performed in the method 500 at any time after part 506 has been performed.

The replaceable item may thus determine that the selected identity that it has assumed resulted implicitly or explicitly in successful authentication of the item within the host device. In this case, the replaceable item stores information indicating that authentication of the selected identity was successful for the host device (520), which can include storing the address of the host device. If the replaceable item is a print cartridge and the host device is a printing device, for instance, if the printing device begins using the cartridge to form images on media, then the item can conclude that implicit successful authentication has occurred. As another example, the host device may explicitly indicate to the replaceable item that the item has been successfully authenticated. Part 520 is performed after parts 516 and 518 have been performed if the host device authenticates the selected identity that the replaceable item sent in part 518 in response to the device's request that the item received in part 516.

Figure 6:
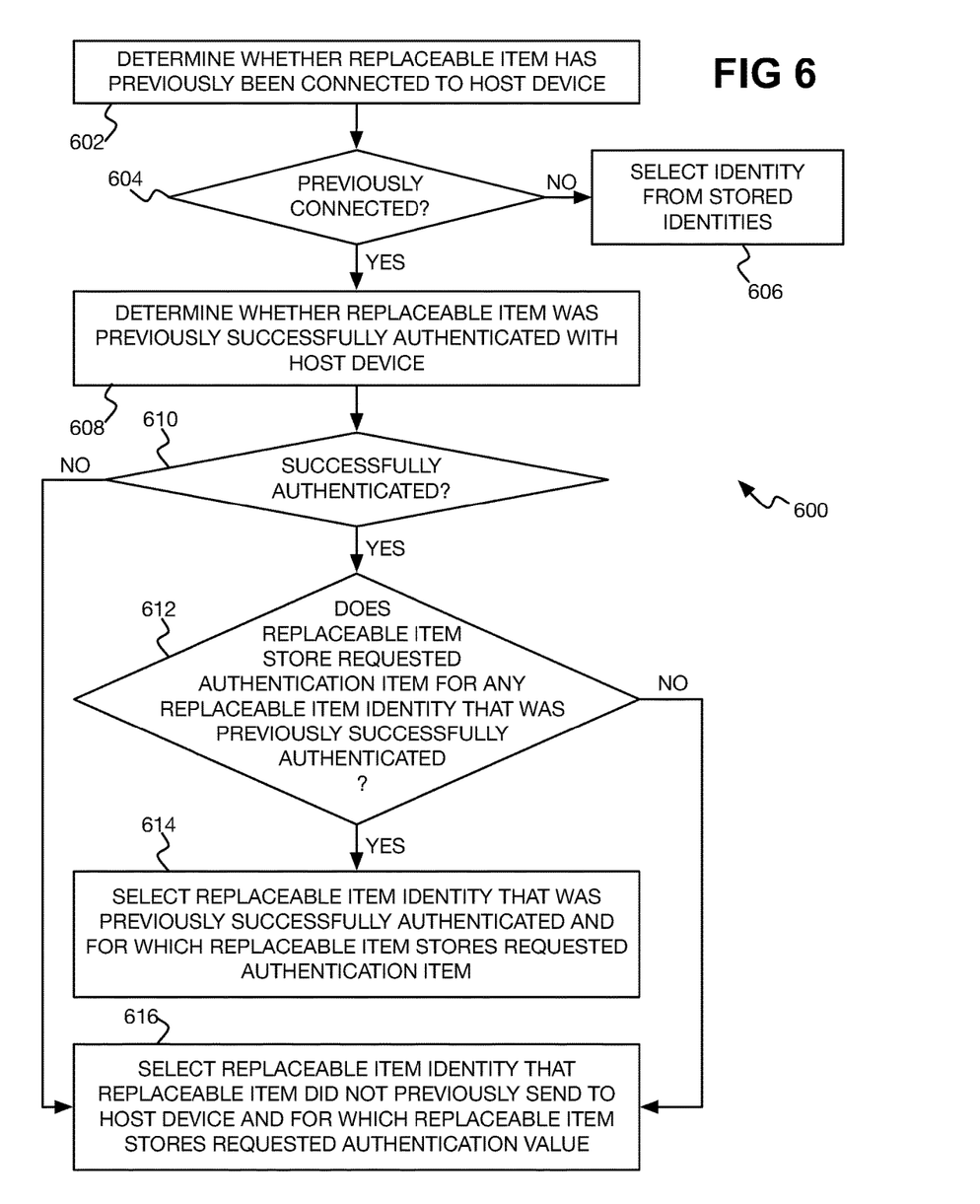
FIG. 6 is a flowchart of an example method that a print substance cartridge or other replaceable item for a device can perform to implement a portion of the method of FIG. 5.

FIG. 6 shows an example method 600 that a replaceable item for a device can perform to select an identity to assume within the device at power on in the method 500. For instance, a replaceable item can perform the method 600 to implement part 506 of the method 500, after the item has received a request for an authentication value from the host device in part 502 and before the item has received a request for its identity in part 516. The replaceable item determines whether it has previously been connected to the host device (602), as has been described in relation to part 402 of the method 400.

If the replaceable item has not been previously connected to the host device (604), then in one implementation the replacement item randomly selects a replaceable item identity from the replaceable item identities that it stores (606), as has been described in relation to part 406 of the method 400, but with the added condition that the replaceable item selects an identity for which it stores the requested authentication value. Furthermore, in other implementations, the replaceable item may select a replaceable item identity in part 606 in a different manner. The replaceable item may select a replaceable item identity in part 606 in another manner as has been described in relation to part 406 of the method 400, but also with the added condition that the replaceable item selects an identity for which it stores the requested authentication value.

This added condition represents the knowledge that the replaceable item has in performing the method 500 (and thus the method 600) that it does not have in performing the method 300 (and thus the method 400). When the replaceable item performs the method 600, the item has already received a request for an authentication value from the host device per part 502 of the method 500. By comparison, when the replaceable item performs the method 400, the item has not yet received a request for an authentication value form the host device. Therefore, in part 606, even though the replaceable item has not been previously connected to the host device, the item still already knows the first authentication value that the host device is requesting, and as such selects an identity for which the item stores the requested authentication value.

If the replaceable item has been previously connected to the host device (604), then the item determines whether it was previously successfully authenticated with the host device (608). As is the case with part 408 of the method 400, part 608 may test just whether the replaceable item was previously successfully authenticated with the host device during the immediately prior power on when connected to the device. That is, in one implementation, part 608 tests whether the last time the replaceable item was connected to the host device and powered on, the replaceable item was successfully authenticated.

If the replaceable item was previously successfully authenticated with the host device (610) and if the replaceable item stores the requested authentication value for a replaceable item identity that the host device authenticated (612), then the replaceable item again selects such an identity (614). As noted above, in performing the method 600, the replaceable item already has knowledge of the first authentication value that the host device is requesting. Therefore, even if the replaceable item was previously successfully authenticated with the host device, if the item was successfully authenticated by using a given identity for which the item does not store the requested authentication value, then the given identity will not again result in authentication of the item. At a minimum, in other words, the replaceable item in the method 600 selects an identity for which the item stores the requested authentication value.

It is noted that when the replaceable item selects an identity in part 614, there may be multiple identities with which the item was previously successfully authenticated with the host device. In this case, the replaceable item may randomly select from one of these identities. In another implementation, the replaceable item may select the identity with which the item was most recently successfully authenticated with the host device.

If the replaceable item was not previously successfully authenticated with the host device (610), or if the replaceable item was previously successfully authenticated (610) but the item does not store the requested authentication item for an identity that the host device authenticated (612), then the replaceable item may select a replaceable item identity that the item has not previously sent to the host device (616). Such an identity is also one for which the replaceable item stores the requested authentication value of which the item has knowledge. In this implementation, the replaceable item can randomly or in an ordered manner select an identity from the replaceable item identities that the item has not assumed before with the host device and that stores the requested authentication value. In a second implementation, the replaceable item may randomly or in an ordered manner select an identity from the replaceable item identities for which the item stores the requested authentication value, regardless of whether the identity was previously unsuccessfully authenticated with the host device.

A third implementation of part 616, however, may be employed when it is assumed that the host device is likely to request the same authentication values from the replaceable item as it did during prior authentication requests. In this implementation, the replaceable item may randomly or in an ordered manner select an identity from the replaceable item identifies for which it stores the authentication values that the host device previously requested, as well as the authentication value that the device is currently requesting. This third implementation corresponds to the third implementation of part 414 of the method 400 described above, with the added condition that the replaceable item also stores for the selected identity the authentication value that the device is currently requesting. As in part 414, a further implementation may further be used that combines two or more of the three implementations that have been described.

The methods 400 and 600 that have been described thus provide various ways by which a replaceable item for a host device can select an identity to proffer to the device for authentication of the item with the device. The difference between the methods 400 and 600 is the knowledge that the replaceable item has when selecting an identity to assume with the host device. In the method 400, the replaceable item has yet not received a request for an authentication value from the host device, whereas in the method 600, the item has already received a first request for an authentication value. Therefore, all other things being equal, the replaceable item is more likely to select an identity that will result in successful authentication in the method 600 than in the method 400.

Figure 7:
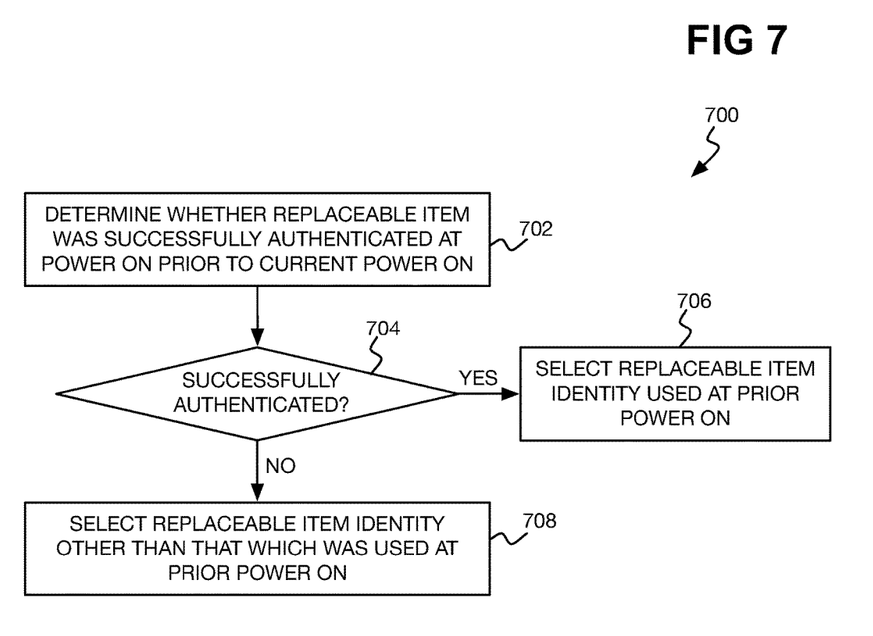
FIG. 7 is a flowchart of a third example method that a print substance cartridge or other replaceable item for a device can perform to select a replaceable item identity, which is consistent with descriptions of the methods FIGS. 4 and 6.

FIG. 7 shows another example method 700 that a replaceable item for a host device, such as the print substance cartridge 100 for a printing device, can perform to select an identity to assume for authentication purposes with the device. The method 700 is a particular case of each of the methods 400 and 600. Like the other methods that have been described, the method 700 can be implemented as computer-readable code stored on a non-transitory computer-readable data storage medium and that a processor executes. Therefore, the logic 104 of the cartridge 100 can perform the method 700.

The method 700 assumes the following scenario. A replaceable item is connected to a first host device and powered on. The item may or may not have been successfully authenticated using the replaceable item identity it assumed at this power on. The replaceable item is powered on a second time. At second power on, the item may still be connected to the first host device, or it may now be connected to a second host device different than the first host device.

The replaceable item determines whether it was successfully authenticated at the (first) power on prior to the current (second) power on (702). If the replaceable item was successfully authenticated at the prior power on (704), then the item again selects or assumes the replaceable item identity that it used at the prior power on (706). The replaceable item selects this identity regardless of whether it is installed in a different (second) host device or in the same (first) host device at the current power on as compared to at the prior power on. In the case in which the replaceable item has already received a request for an authentication value from the host device—as in the methods 500 and 600 of FIGS. 5 and 6—however, the item selects the previously successfully authenticated identity just if the item also stores the requested authentication value for this identity.

If the replaceable item was not successfully authenticated at the prior power on (704), however, then the item selects or assumes a different replaceable item identity than it used at the prior power on (708). How this different replaceable item identity is selected can be determined as has been described above in relation to the methods 400 and 600. The method 700 therefore prioritizes usage of the most recently selected replaceable item identity, if that identity was successfully authenticated.

The techniques disclosed herein provide for a replaceable item for a host device, such as a print substance cartridge for a printing device, which may also pass authentication within the device. Such a replaceable item, in other words, can be employed within a host device that requests authentication values from the item and authenticates the item based on the values that the item returns. Rather than storing one complete set of authentication values, the replaceable item can store multiple partial sets of authentication values, where each partial set is tied to a different replacement item identity. The different partial sets may be obtained by interrogating other replaceable items that each store a complete set of authentication values, but that each will just provide a limited subset of its values.

We claim:

1. A method comprising:
   prior to a replaceable item receiving a request for an identity of the replaceable item from a host device to which the replaceable item has been connected, and in response to the replaceable item receiving a request for an authentication value from the host device, selecting, by the replaceable item, the identity from a plurality of replaceable item identities stored within the replaceable item, the replaceable item storing a plurality of authentication values for each replaceable item identity, the identity selected as one of the replaceable item identities for which the replaceable item stores the requested authentication value; and
   after selecting the identity, sending, by the replaceable item, the requested authentication value for the selected identity to the host device.

2. The method of claim 1, further comprising:
   in response to the replaceable item receiving a request for the identity of the replaceable item from the host device, sending, by the replaceable item, the selected identity to the host device.

3. The method of claim 1, further comprising:
   prior to the replaceable item receiving the request for the identity of the replaceable item from the host device, after sending the requested authentication value for the selected identity to the host device, and in response to receiving a request for a second authentication value from the host device, determining, by the replaceable item, whether the replaceable item stores the requested second authentication value for the selected identity; and
   in response to determining that the replaceable item stores the requested second authentication value for the selected identity, sending, by the replaceable item, the requested second authentication value for the selected identity to the host device.

4. The method of claim 1, wherein selecting the identity from the replaceable item identities stored within the replaceable item comprises:
   determining whether the replaceable item has been previously connected to the host device; and
   in response to determining that the replaceable item has not been previously connected to the host device, randomly selecting the identity from the replaceable item identities for which the replaceable item stores the requested authentication value.

5. The method of claim 1, wherein selecting the identity from the replaceable item identities stored within the replaceable item comprises:
   determining whether the replaceable item was previously successfully authenticated with the host device; and
   in response to determining that the replaceable item was previously successfully authenticated with the host device, selecting the identity that was previously successfully authenticated with the host device if the replaceable item stores the requested authentication value for the identity that was previously authenticated with the host device.

6. The method of claim 1, wherein selecting the identity from the replaceable item identities stored within the replaceable item comprises:
   determining whether the replaceable item was previously unsuccessfully authenticated with the host device; and
   in response to determining that the replaceable item was previously unsuccessfully authenticated with the host device, selecting the one of the replaceable item identities for which the replaceable item stores the requested authentication value and for which the replaceable item also stores the authentication values that the host device previously requested when the replaceable item was previously unsuccessfully authenticated.

7. The method of claim 1, wherein selecting the identity from the replaceable item identities stored within the replaceable item comprises:
   determining whether the replaceable item was previously unsuccessfully authenticated with the host device; and
   in response to determining that the replaceable item was previously unsuccessfully authenticated with the host device, selecting the one of the replaceable item identities for which the replaceable item stores the requested authentication value and that the replaceable item did not select when the replaceable item was previously unsuccessfully authenticated.

8. The method of claim 1, further comprising:
   in response to the replaceable item receiving the request for the authentication value from the host device, storing information indicating that the host device requested the authentication value;
   in response to the replaceable item determining that the replaceable item has been successfully authenticated with the host device, storing information indicating that the replaceable item has been successfully authenticated with the host device; and
   in response to the replaceable item determining that the replaceable item has been unsuccessfully authenticated with the host device, storing information indicating that the replaceable item has been unsuccessfully authenticated with the host device.

9. A print substance cartridge for a printing device, comprising:
   a supply of print substance for the printing device;
   a non-volatile memory storing a plurality of cartridge identities, and for each identity a plurality of passwords; and
   logic to, at power on of the cartridge, assume as an identity of the cartridge to use for authentication the cartridge identity that the logic assumed prior to the power on if the cartridge was successfully authenticated with the cartridge identity that the logic assumed prior to the power on.

10. The print substance cartridge of claim 9, wherein the cartridge identity that the logic assumed prior to power on is a prior cartridge identity,
    and wherein the logic is further to, at the power on, assume as the identity of the cartridge to use for authentication a different cartridge identity than the prior cartridge identity if the cartridge was unsuccessfully authenticated with the prior cartridge identity.

11. The print substance cartridge of claim 9, wherein the cartridge identity that the logic assumed prior to power on is a prior cartridge identity,
    and wherein the logic is further to, at the power on, assume as the identity of the cartridge to use for authentication the prior cartridge identity if the cartridge was successfully authenticated with the prior cartridge identity and if the cartridge stores a requested password for the prior cartridge identity.

12. The print substance cartridge of claim 9, wherein the logic is further to, in response to a request from the printing device for a password:
    determine whether the non-volatile memory stores the requested password for the assumed identity; and if the non-volatile memory stores the requested password for the assumed identity, send the requested password for the assumed identity.

13. The print substance cartridge of claim 9, wherein the print substance is one or more of: ink, toner, two-dimensional (2D) colorant, three-dimensional (3D) printing agent, and 3D printing build material.

* * * * *

UNITED STATES PATENT AND TRADEMARK OFFICE
CERTIFICATE OF CORRECTION

PATENT NO. : 9,961,234 B1  
APPLICATION NO. : 15/672970  
DATED : May 1, 2018  
INVENTOR(S) : Stephen D. Panshin et al.

Page 1 of 1

It is certified that error appears in the above-identified patent and that said Letters Patent is hereby corrected as shown below:

In the Claims

In Column 16, Line 41, in Claim 9, after "authentication" insert -- of --.

In Column 16, Line 51, in Claim 10, after "authentication" insert -- of --.

In Column 16, Line 59, in Claim 11, after "authentication" insert -- of --.

Signed and Sealed this  
Thirteenth Day of November, 2018

Andrei Iancu  
*Director of the United States Patent and Trademark Office*